United States Patent
Zarom

(10) Patent No.: US 9,277,269 B2
(45) Date of Patent: Mar. 1, 2016

(54) SYSTEM AND METHOD FOR SYNCHRONIZED INTERACTIVE LAYERS FOR MEDIA BROADCAST

(71) Applicant: Rony Zarom, New York, NY (US)

(72) Inventor: Rony Zarom, New York, NY (US)

(73) Assignee: NEWROW, INC., New York, NY (US)

( * ) Notice: Subject to any disclaimer, the term of this patent is extended or adjusted under 35 U.S.C. 154(b) by 0 days.

(21) Appl. No.: 14/361,461

(22) PCT Filed: Nov. 29, 2012

(86) PCT No.: PCT/US2012/067038
§ 371 (c)(1),
(2) Date: May 29, 2014

(87) PCT Pub. No.: WO2013/082270
PCT Pub. Date: Jun. 6, 2013

(65) Prior Publication Data
US 2014/0344856 A1 Nov. 20, 2014

Related U.S. Application Data

(60) Provisional application No. 61/564,655, filed on Nov. 29, 2011.

(51) Int. Cl.
*G06F 3/00* (2006.01)
*H04N 21/431* (2011.01)
(Continued)

(52) U.S. Cl.
CPC ........... *H04N 21/431* (2013.01); *H04H 20/106* (2013.01); *H04H 20/33* (2013.01);
(Continued)

(58) Field of Classification Search
CPC ....................... H04N 5/44543; H04N 21/4622
See application file for complete search history.

(56) References Cited

U.S. PATENT DOCUMENTS

| 6,970,937 B1 | 11/2005 | Huntington |
| 2002/0007485 A1 | 1/2002 | Rodriguez et al. |

(Continued)

FOREIGN PATENT DOCUMENTS

| WO | WO 00/01148 A2 | 1/2000 |
| WO | WO 01/31497 A1 | 5/2001 |

OTHER PUBLICATIONS

International Search Report for International Application No. PCT/US2012/067038, mailed Feb. 5, 2013.
(Continued)

*Primary Examiner* — Robert Hance
*Assistant Examiner* — Alfonso Castro
(74) *Attorney, Agent, or Firm* — Pearl Cohen Zedek Latzer Baratz LLP

(57) ABSTRACT

A system and method for broadcasting to a plurality of client side devices over a network, such as the Internet, using visual layers for assembly in a media broadcast. In response to receiving input for simulating the media broadcast defined by content objects and arrangement of each layer in the simulation, transmitting the content objects for each of a plurality of the layers in a different live stream to each of the client side devices and transmitting design parameters defining the arrangement of the layers in the simulation to each of the client side devices. Each of the client side devices may be adapted to assemble the layers of a media broadcast according to the content objects and design parameters of the transmissions so that the content objects and design of the media broadcast assembled at each of the client side devices substantially matches that of the simulated media broadcast.

12 Claims, 5 Drawing Sheets

(51) Int. Cl.
*H04H 20/10* (2008.01)
*H04H 20/33* (2008.01)
*H04H 20/82* (2008.01)
*H04H 20/93* (2008.01)
*H04H 60/06* (2008.01)
*H04N 21/266* (2011.01)
*H04N 21/2668* (2011.01)
*H04N 21/472* (2011.01)
*H04N 21/8545* (2011.01)

(52) U.S. Cl.
CPC .............. *H04H 20/82* (2013.01); *H04H 20/93* (2013.01); *H04H 60/06* (2013.01); *H04N 21/266* (2013.01); *H04N 21/2668* (2013.01); *H04N 21/47205* (2013.01); *H04N 21/8545* (2013.01)

(56) References Cited

U.S. PATENT DOCUMENTS

| | | |
|---|---|---|
| 2002/0031756 A1 | 3/2002 | Holtz et al. |
| 2002/0040366 A1 | 4/2002 | Lahr |
| 2003/0217360 A1* | 11/2003 | Gordon et al. ................. 725/54 |
| 2007/0005795 A1* | 1/2007 | Gonzalez ..................... 709/232 |
| 2012/0254912 A1 | 10/2012 | Carney et al. |

OTHER PUBLICATIONS

Search and Examination Report for Singapore Application No. 11201402697S, mailed Apr. 29, 2015.

Extended European Search Report for European Application No. 12852621.7, mailed Jun. 22, 2015.

* cited by examiner

SYSTEM AND METHOD FOR SYNCHRONIZED INTERACTIVE LAYERS FOR MEDIA BROADCAST

CROSS-REFERENCE TO RELATED APPLICATIONS

This application is a National Phase Application of PCT International Application No. PCT/US2012/067038, International Filing Date Nov. 29, 2012, claiming priority of U.S. Patent Application No. 61/564,655, filed Nov. 29, 2011, which are hereby incorporated by reference.

FIELD OF THE INVENTION

The present invention relates to systems and methods for providing and operating visual layers for assembly in a media broadcast, such as, an Internet broadcast.

BACKGROUND OF THE INVENTION

Broadcasts for news or media shows or for personal use may stream multiple video, audio, graphics and/or text objects, simultaneously, using separate media layers. Such broadcasts can occur via standard broadcast format, e.g., on a monitor display, or via Internet, e.g., in a webpage. Each media layer may be a static object (e.g., a logo or title of the broadcast) or may be dynamic (e.g., a news ticker or video player).

Different media layers may have different media sources. For example, layer 1 (the primary layer) may be a media show (e.g., recorded via one or more video cameras), layer 2 may be a logo for the network (e.g., uploaded from a computer) and layer 3 may be a news ticker (e.g., streamed from a news server). However, regardless of the diversity of data sources, all the media layers may be assembled and merged at a centralized server into a single media stream transmitted to all the viewer devices for display. Accordingly, every viewers' broadcast is identical. Furthermore, since the media layers are merged before transmission, every viewer's broadcast is fixed and can only be passively viewed, not actively manipulated. Such systems may prevent interactive or collaborative broadcast environments.

SUMMARY OF THE INVENTION

According to some embodiments of the invention, a system and method is provided for broadcasting to a plurality of client side devices. Input may be received for simulating a media broadcast comprising a plurality of media layers. Each layer may be defined by content objects and arrangement in the simulation. Receiving the input may trigger the transmission of the content objects for each of a plurality of the layers in a different live stream to each of the client side devices. Receiving the input may trigger the transmission of design parameters defining the arrangement of the layers in the simulation to each of the client side devices. Each of the client side devices may be adapted to assemble the layers of a media broadcast according to the content objects and design parameters of the transmissions so that the content objects and design of the media broadcast assembled at each of the client side devices substantially matches that of the simulated media broadcast.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

Figure 1:
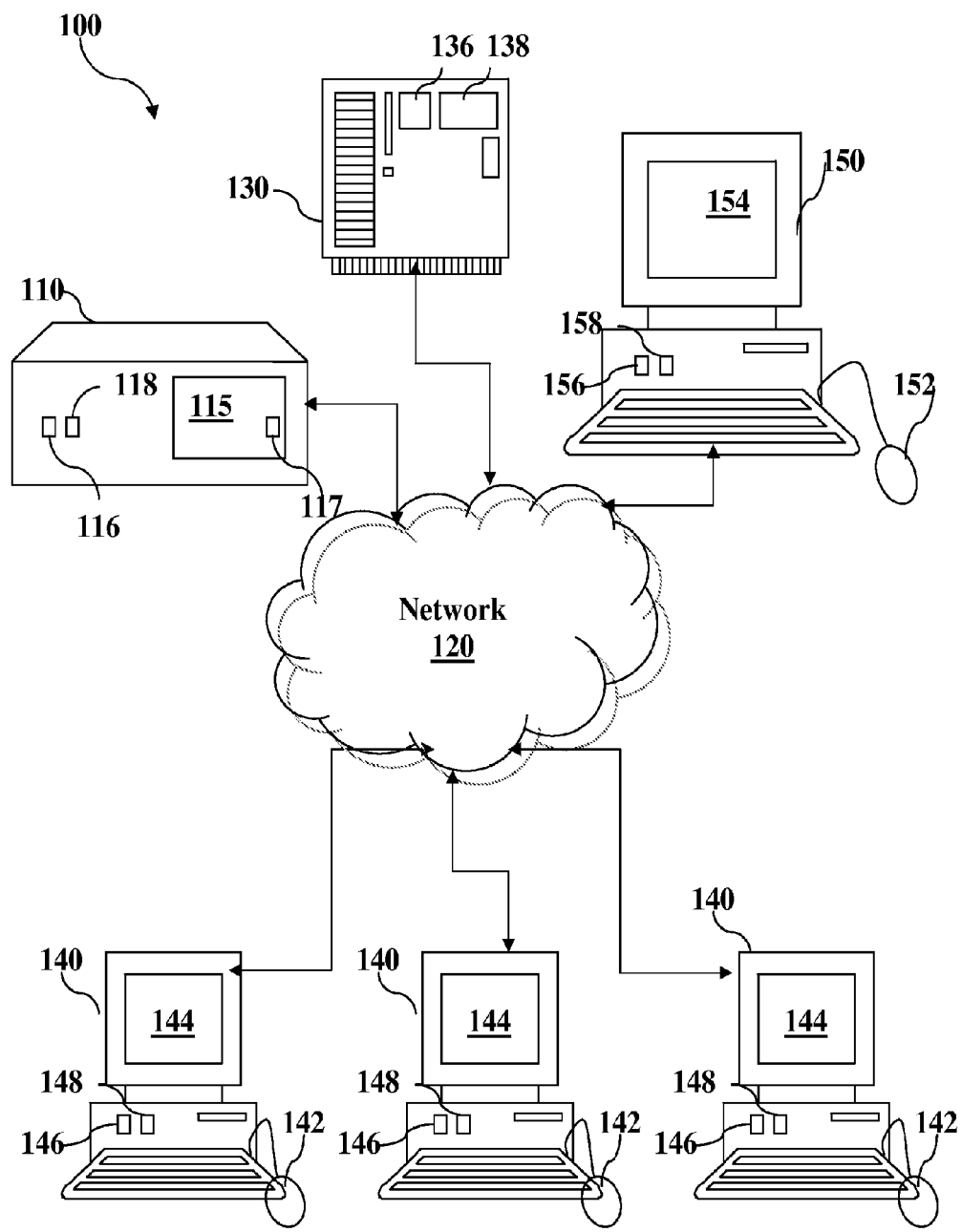
FIG. 1 is a schematic illustration of a system for assembling layers of a media broadcast at client side devices in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

"Broadcast" may mean any display, stream, playback or presentation of content in any medium, such as, image, videos, multi-media, audio, text, graphics, etc. Broadcasts may be provided via any public or private media channel, for example, a wired or wireless channel or network such as the Internet, television, closed-circuit television, radio, on a user's computer, etc. Broadcasts may be displayed on any output device, such as a television screen, personal computer monitor, wireless device monitor, cellular phone monitor, tablet computer monitor, radio player, etc. Broadcasts may use any personal or collaborative viewing platform including web-based seminars (webinars), synchronized media displays for a collection of viewers, etc. In some embodiments herein, Internet broadcast is described as an example and may refer to any other type of broadcast of streaming display.

Broadcasts may include a plurality of media layers. Each media layer may include content or media objects, such as, for example, images, videos, audio tracks, text streams, social media or chat streams, webpages, applications, advertisements, etc. Multiple media layers may be assembled to create a broadcast with complex combinations of the media objects. Broadcasts may also include a plurality of design parameters, which define how the basic components of the broadcast, i.e., the layers, are assembled. Design parameters may include, for example, which layers to broadcast, the order of the layers (e.g., from front to back), the spatial arrangement of the layers or objects therein, the opacity or transparency of the layers, background designs, etc.

Figure 4:
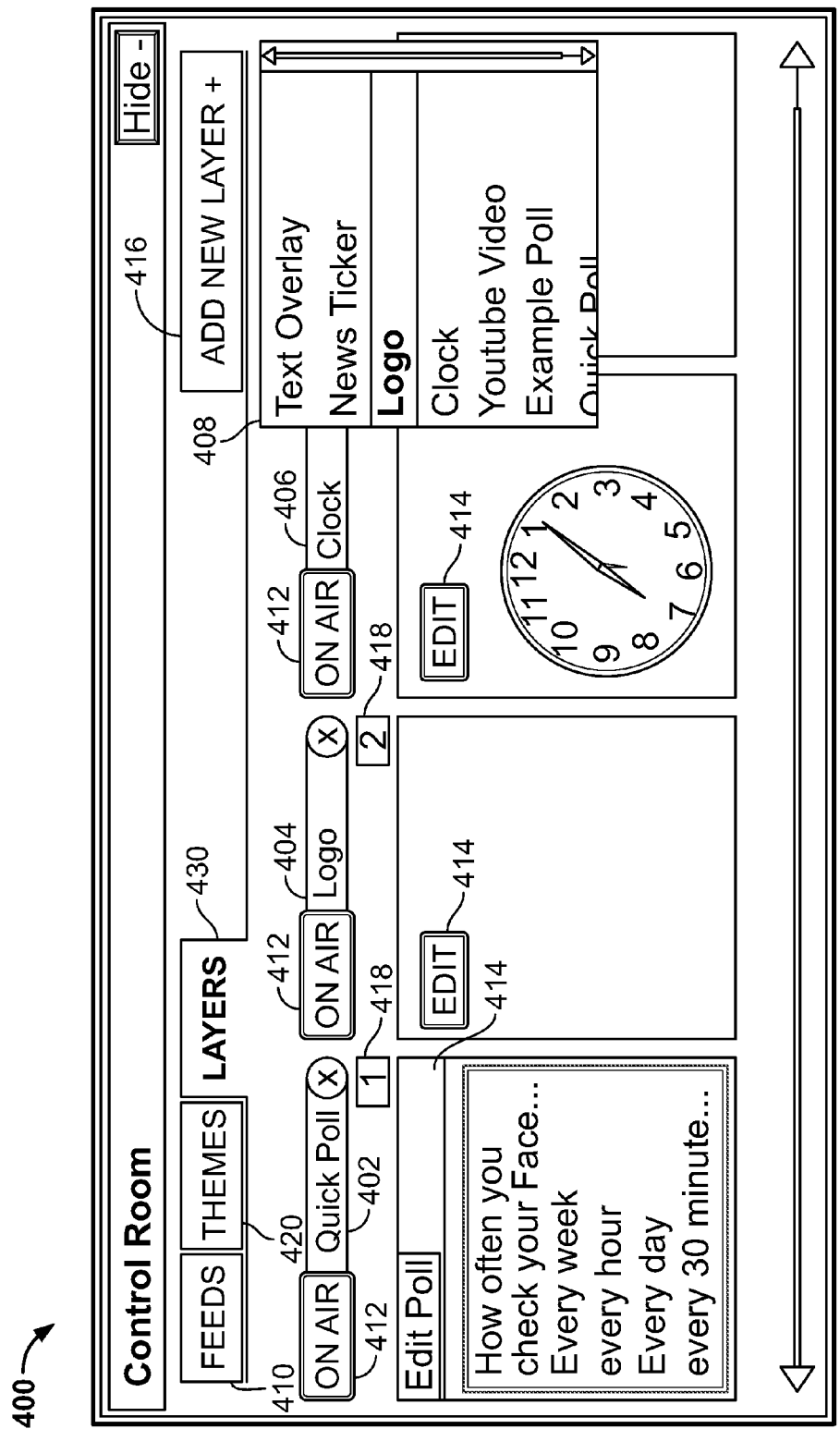
FIG. 4 is a schematic illustration of a user interface for simulating a media broadcast in accordance with embodiments of the invention.

A broadcast creator or moderator may design the broadcast by manipulating and controlling an interactive design interface, for example, as shown in FIG. 4, to create a simulation of the broadcast on the moderator screen. The design interface may function as a staging area or "green room", which may mimic the broadcast screen, for example, to prepare a broadcast "off-air," but only implement the broadcast once an "on-air" signal is sent.

To generate the content of the broadcast, the design interface may be connected to a database of real or simulated media objects from which the layers' content is selected, edited and/or created. Simulated media objects may be fully instantiated copies of the real objects or may be simplified mock objects mimicking the functionality of the real objects, but only providing a link or reference to the real objects at their data sources to be used for the actual broadcast.

To design the broadcast, the moderator may interact in the simulation environment to create a broadcast design. The simulated design may be automatically transcribed to generate design parameters values. For example, if the moderator drags a layer to a primary (front) position in the broadcast simulation, a set of design parameter values may be created corresponding to that change, for example, (layer order=1). design parameters associated with each layer may include, for example, layer identification (ID), layer order, reference coordinate for object(s) on screen (upper-left pixel), object size or dimensions (pixels×pixels), layer transparency, runtime, etc.

Once the content and design of the broadcast is simulated at the moderator device, instead of the moderator transmitting the complete broadcast itself, as is conventionally done, embodiments of the invention may send the broadcast components separately, for example, as a plurality of disconnected layers and design parameters. The moderator's device may transmit the layers' content and design parameters to each of a plurality of viewer or client devices.

Broadcast layers may be assembled and synchronized to create a broadcast at the client side. In contrast to conventional broadcasts, which merge layers at the moderator side and send viewers a single broadcast stream, embodiments of the invention may transmit data for each layer separately, e.g., each in a different live stream, to the viewer or client device where the layers may be assembled and synchronized at the client device itself. In order to be able to implement such client side broadcasting, each client device may have logic to input a plurality of disconnected layers and design parameters (defined by the moderator simulation) and assemble the layers into a broadcast according to the design parameters. The logic and data may be installed in the client device as an application, plug-in, software or code, or may be streamed together with the layers and/or design parameters. The content of the layers may be transmitted to the client device directly from different source servers (e.g., a news server, a web server, etc.), the moderator device and/or a centralized server, while the design parameters may be transmitted to the client device from the moderator device and/or centralized server.

Once assembled, the client side broadcast may have content objects and a design that are identical to those in the moderator broadcast simulation. However, assembling the broadcast at the client device instead of simply sending the simulated broadcast pre-assembled from the moderator to the client device may have several advantages. For example, although the client side broadcast has the same content objects as the moderator broadcast simulation, these media objects may be instantiated differently at different client devices so to provide interactive and/or personalized broadcasts.

Broadcasts assembled at the client device may be interactive. Since each layer is sent to the client as an individual entity, e.g., in a separate media stream, each layer may operate autonomously with live interactive objects. The content of each layer may provide the client device with interactive functionality from the source server (e.g., either directly or via an intermediary device). In one example, a viewer may interact with one or more interactive features of a webpage layer presenting data from a web server, for example, by clicking on a tab for a more detailed view of the data, inputting data, retrieving data, requesting updates, etc. The broadcast layer may allow the viewer to expand data fields, open windows, rearrange objects and otherwise interact with objects in the layer environment with the same functionality as provided when interacting with those objects directly in the source servers' environments.

In an example broadcast, an interactive shopping cart layer may be overlaid on a video layer of a shopping show, where the shopping cart layer may allow the viewer to purchase the products that appear in the shopping show. The content of the layers may be linked such that, when the product changes in the show layer, the purchase information in the shopping cart layer also changes accordingly. The interactive capabilities may be loaded to the client (in the layer) or may be streamed to the client in a live link from the source server. It may be noted that only some media objects are interactive, such as, applications, webpages, shopping carts, while others are not, such as, news tickers, clocks, media shows, etc.

Broadcasts may be personalized to the viewer at each client device. Although broadcasts may be synchronized so that all viewers simultaneously experience the same combination of media objects and design of layers, the content instantiated for each media object may be dynamic and personalized to each individual viewer or client account. The content may be targeted to viewers, for example, based on personal information, such as, language, age, geography or zip code, web history, etc. For example, sports layers may highlight teams local to the viewers' zip codes, shopping layers may sell products recently viewed by the viewers, advertisements may be targeted to the viewers' demographics, and all layers may be provided in the users' selected language. Such personal information may be stored at the client device (e.g., as operating system settings or web metadata or cookies), at a centralized server (e.g., entered by the viewer when he creates an account) or at the media object source (e.g., each layer may record its own history with the viewer). In one embodiment, storing personal information at the client device and/or encrypting or otherwise protecting the data may increase the security of such personal information.

Broadcasts may be designed in real-time. For example, as the moderator adds layers into the design simulation and/or selects an "on-air" feature, these layers and their corresponding design parameters may be transmitted automatically or instantaneously to the client where they may be automatically assembled and broadcast in a synchronized manner.

Although some embodiments of the invention describe broadcasting media in an Internet, television, radio or other broadcast display, it may be appreciated that such embodiments of the invention may similarly be used for any other type of display, including, for example, newspaper or magazine layout, text or multi-media layout, combining different layers of an audio tracks as an automated disk-jockey, or any other system and method for designing and displaying layered media objects.

Reference is made to FIG. 1, which schematically illustrates a system 100 for assembling layers of a media broadcast at client side devices 140 in accordance with an embodiment of the invention.

System 100 may include a moderator device 150 for designing a broadcast, source servers 110 for providing broadcast data, a plurality of user devices 140 to view and/or listen to ("display") broadcasts, and a broadcast server 130 to interconnect their functionality, all of which communicate via a network 120 such as a television network, radio network or the Internet. Client device 140 may subscribe to the broadcast, access the broadcast via a website or television, log into a collaborative session, or may be targeted without initiating the broadcast.

Figure 2:
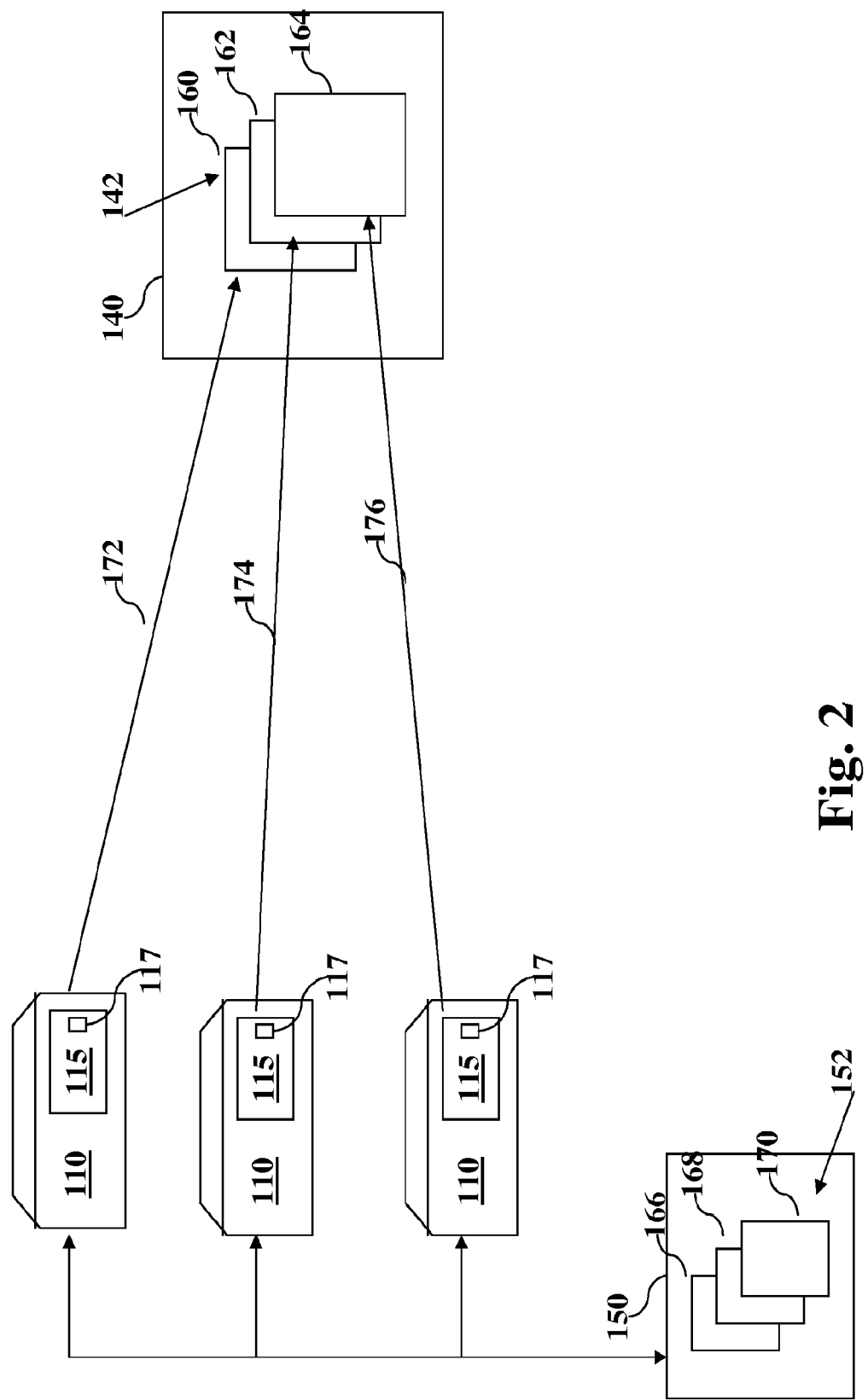
FIG. 2 is a schematic illustration of media layers assembled into a media broadcast at a client side device in accordance with an embodiment of the invention.

One or more moderator device(s) 150 may be operated by moderators or broadcasters to design media broadcasts. Moderator device 150 may include logic provided remotely by broadcast server 130 or locally by an application, plug-in, software or code installed at moderator device(s) 150, which when executed by a processor 136 or 156, may create a design interface (e.g., interface 400 of FIG. 4) displayed on an output device 154. The moderator may interact via input device 152 with the design interface to create a broadcast simulation. The broadcast simulation may include layers (pages of media objects to be broadcast) and design parameters (defining the layout of the layers in the broadcast simulation). Moderator device 150 may be connected to a source server 110 having a database 115 of media objects 117. The media objects used in the design simulation may be real copies of media objects 117 or simulations of those objects (e.g., placeholder objects with simpler functionality to manipulate in the design interface). Typically each source server 110 provides the media objects for a unique layer (e.g., as shown in the example of FIG. 2), although any combination of one or more servers 110 may provide the media objects for any combination of one or more layers.

Moderator device 150 may transmit the layers and design parameters defined in the broadcast simulation to one or more client device(s) 140, e.g., each viewed by a user via network 120 over any media channel, such as, Internet, television, radio, podcasts, etc. The layers may include real copies of the media objects and/or addresses or pointers to the original media objects 117, which may be transmitted separately from source servers 110.

Client device 140 may include logic provided remotely by broadcast server 130 or locally by an application, plug-in, software, code, which, when executed by a processor 136 or 146, may input the broadcast layers, design parameters and, if transmitted separately from the layers, the media content objects, and may output an assembled broadcast. The broadcast play may be synchronized at all client devices 140 (e.g., by a clock stored at broadcast server 130 or locally at each client device 140). The broadcast at each client device 140 may be designed according to the simulation at moderator device 150. The broadcasts may be personalized for each user, account, or log-in at client device 140 according to their personal information, e.g., stored at client device 140, moderator device 150, servers 110 and/or a centralized customer information repository in broadcast server 130. The user operating client device 140 may interact with the layers and media objects, via interactive functionality provided with the layer or media object or streamed in real-time from servers 110.

Broadcast server 130 may provide centralized functionality to client device 140 and moderator device 150 to provide a design interface (e.g., interface 400 of FIG. 4). For example, broadcast server 130 may include logic to receive content objects and design input from moderator device 150 to simulate broadcast layers, to trigger transmissions to client device 140 according to the simulated input of the content objects (e.g., transmitted from source servers to instantiate the objects) and to trigger transmissions according to the simulated input of the design parameters (e.g., transmitted from broadcast server 130 itself). Alternatively or additionally, client device 140 and moderator device 150 may include logic to provide their own functionality, e.g., installed as an application, plug-in, software, code, etc.

Client device 140 and moderator device 150 may be personal computers, desktop computers, mobile computers, laptop computers, and notebook computers or any other suitable device such as a cellular telephone, personal digital assistant (PDA), video game console, television, etc. Client device 140 and moderator device 150 may include one or more input devices 142 and 152, respectively, for receiving input from a user. Client device 140 may include one or more output devices 144 (e.g., a monitor or screen) for displaying a broadcast to a viewer. Moderator device 150 may include one or more output devices 154 for displaying to a design interface having entry fields and uploading capabilities for designing, selecting and creating broadcasts.

Network 120, which connects source server 110, broadcast server 130, client device 140 and moderator device 150, may be any publicly or privately accessible network such as the Internet, television, etc. Access to network 120 may be through wire line, terrestrial wireless, satellite or other systems.

Server 110, broadcast server 130, client device 140, and moderator device 150, may include one or more processor(s) 116, 136, 146, and 156, respectively, for executing operations and one or more memory unit(s) 118, 138, 148, and 158, respectively, for storing data and/or instructions (e.g., software) executable by a processor. Processor(s) 116, 136, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 138, 148, and/or 158 may include, for example, a random access memory (RAM), a dynamic RAM (DRAM), a flash memory, a volatile memory, a non-volatile memory, a cache memory, a buffer, or other suitable memory units or storage units.

Reference is made to FIG. 2, which schematically illustrates media layers 160, 162, 164 assembled into a media broadcast at a client side device 140 in accordance with an embodiment of the invention.

A moderator or user, e.g., operating monitor device 150, may design a broadcast by simulating broadcast layers 166, 168, 170 in a design simulation 152. Design simulation 152 may be a staging environment provided via a user interface. Design simulation 152 may provide links to media content objects 117 from a plurality of servers 110 and/or databases 115. The moderator may select content and arrange and design the layout of layers 166, 168, 170 by interacting with the user interface, for example, by selecting, dragging and/or highlighting content, layers and options. According to the simulated design, each broadcast layer 166, 168, 170 may include or may be associated with one or more media objects 117, providing the content of the layer, and one or more design parameters, providing the arrangement or design of the layer. Together, the content and design may fully define each layer to form a media broadcast.

However, the broadcast data for layers 166, 168, 170 may not be transmitted together as a single entity, but instead may be transmitted as multiple pieces, each in a separate transmission stream 172, 174, 176, respectively. For example, the content of layers 166, 168, 170 may by derived from multiple different source servers 110 and each different source server 110 may transmit its content separately in a different live transmission stream 172, 174, 176 to each of client devices 140. In addition, the design parameters defining the arrangement of the layers in design simulation 152 may also be transmitted to each of client devices 140. Client devices 140 may merge the content data (e.g., media objects 117) and design data (e.g., design parameters) to assemble layers 160, 162, 164 to reconstruct a media broadcast 142 at client devices 140.

The design and/or content of the client side media broadcast 142 may substantially match the design and/or content of simulated media broadcast 152. However, in some cases, the media object content may be instantiated differently in simulated broadcast 152 and/or at each of client side broadcasts 142. For example, some layers may have personalized and/or interactive content, in which case, the same media objects may have different representations depending on the interactions and/or personalized user information associated with each different client device 140. Regardless, all client devices 140 may reconstruct or assemble media broadcasts for playback substantially simultaneously for synchronized viewing.

Figure 3:
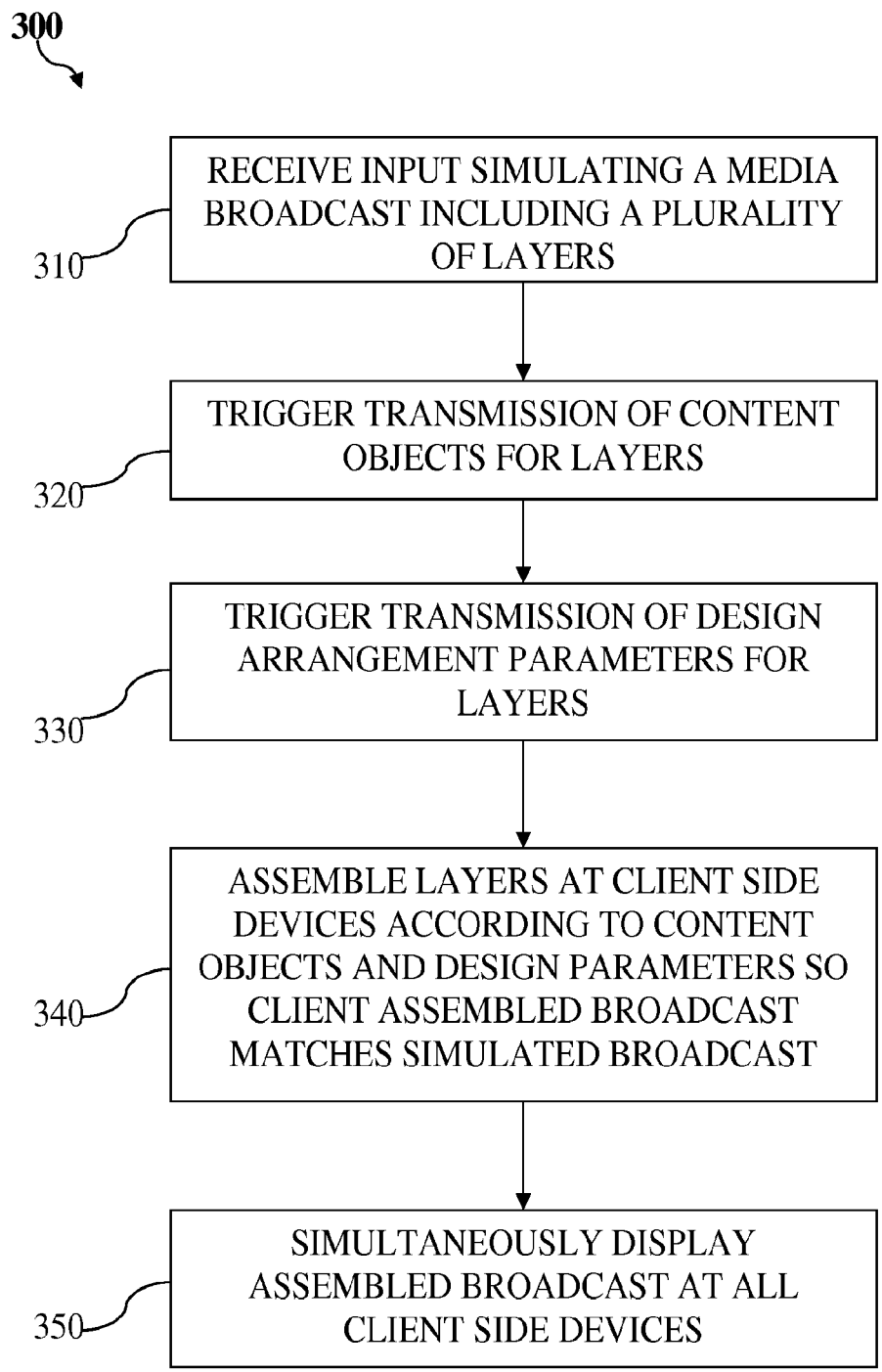
FIG. 3 is a flowchart of a method for client side broadcasting in accordance with an embodiment of the invention.

Reference is made to FIG. 3, which is a flowchart 300 of a method for client side broadcasting in accordance with an embodiment of the invention. Flowchart 300 may be executed using the device components of FIG. 1, such as, broadcast server 130 and its processor 136.

In operation 310, a processor (e.g., broadcast server processor 136) may receive from a user (e.g., a moderator) certain input for simulating a media broadcast (e.g., from design simulation 152). The media broadcast simulation may include a plurality of media layers (e.g., simulated layers 166, 168, 170), where each layer may be defined by its content objects and its arrangement or design in the simulation.

In operation 320, receipt of the broadcast simulation input may trigger a device to transmit the content objects for each of the plurality of layers (e.g., simulated layers 166, 168, 170) separately in a different live stream (e.g., transmission streams 172, 174, 176, respectively) to each of a plurality of client side devices (e.g., client devices 140). The transmitting device may be the simulating device (e.g., monitor device 150), a centralized server or service provider (e.g., broadcast server 130) or each of a plurality of servers originally providing the content objects (e.g., source servers 110).

In operation 330, receiving the broadcast simulation input may also trigger a device to transmit the design parameters defining the arrangement of the layers in the simulation to each of the client side devices. The design parameters may be transmitted separately from the content objects or, alternatively, may be transmitted together with the content objects (e.g., where operation 320 and 330 may be merged into a single operation). In one example, each layer may be transmitted as a data packet containing both its content objects and design parameter data. The transmitting device may be the simulating device or centralized server.

In operation 340, each of the client side devices may assemble layers (e.g., layers 160-164) of a media broadcast (e.g., media broadcast 142) according to the content objects and design parameters of the transmissions so that the content objects and design of the media broadcast assembled at the client side devices substantially matches that of the simulated media broadcast (e.g., media broadcast 152). The content objects may match and, in some cases, may be instantiated with the same or different content at each client side device.

In operation 350, each of the client side devices may simultaneously display the media broadcast, e.g., for synchronized broadcasting. In some embodiments, the media broadcast may be displayed at each of the client side devices in real-time as the media broadcast is simulated (e.g., where the playback operation 350 immediately follows the simulation operation 310). In other embodiments, playback may be set for a later time.

Other operations or orders of operations may be used.

Figure 5:
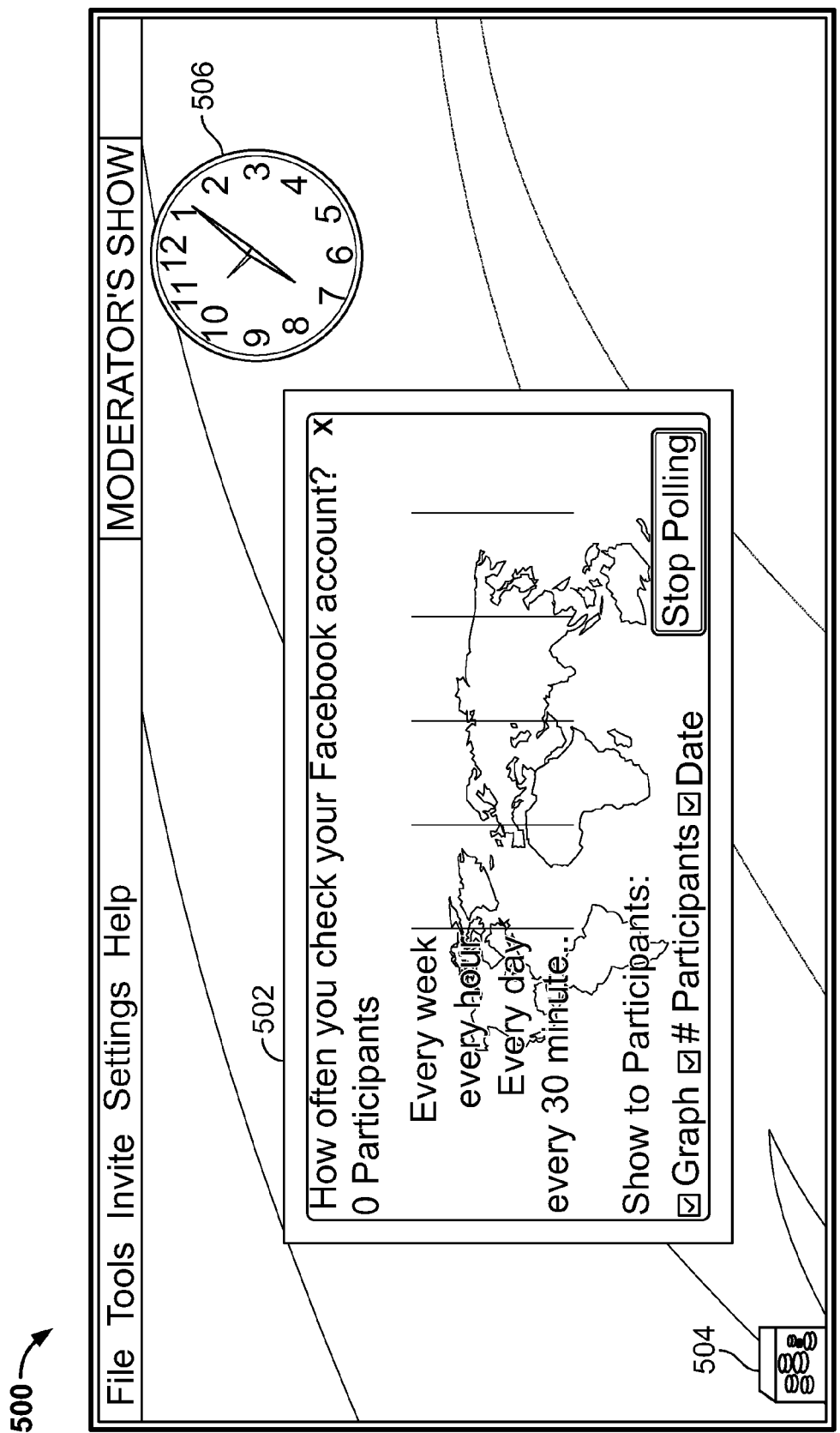
FIG. 5 is a schematic illustration of a user interface for playing a media broadcast in accordance with embodiments of the invention.

Reference is made to FIG. 4, which schematically illustrates a user interface 400 for simulating a media broadcast, and FIG. 5, which schematically illustrates a user interface 500 for displaying the media broadcast in accordance with embodiments of the invention. User interface 400 may be displayed at a moderator's device (e.g., moderator device 150 of FIG. 1) and user interface 500 may be displayed at viewers' devices (e.g., client devices 140 of FIG. 1).

User interface 400 may provide an interactive environment, labeled the "control room" in FIG. 4, in which the moderator may design a media broadcast. User interface 400 may allow the moderator to configure and design feeds 410, themes 420 and layers 430. The feeds 410 interface page may allow the user to control which data sources are used as input to the broadcast. The themes 420 interface page may allow the user to select one of a plurality of design templates or themes for the broadcast (e.g., predefined combinations of backgrounds, colors, icon, boarders, layout, etc.). The layers 430 interface page may allow the moderator to control the content objects and design of the broadcast layers (e.g., layers 166, 168, 170 of FIG. 2). For example, the moderator may operate layers 430 page to select which layers to broadcast (using the "on-air" or "off-air" button 412), design or edit their appearance (using edit tab 414), create new layers (using add new layer tab 416, which initiates a drop field 408 to provide a list of pre-defined layers from which to choose), determine their spatial location (by dragging content objects in an exploded "real simulation" view), manage their playtime, change their order (using layout order fields 418), etc. In the example of FIG. 4, a broadcast with three layers 402, 404, 406 is simulated including a "quick poll" layer 402, a "logo" layer 404, and a "clock" layer 406.

User interface 500 of FIG. 5 shows a broadcast assembled at the viewer or client device according to the content objects and design simulated at the moderator device using user interface 400 of FIG. 4. In the example of FIG. 5, a broadcast is assembled with three layers 502, 504, 506 including a quick poll layer 502, a logo layer 504, and a clock layer 506, e.g., corresponding to the three respective simulated layers 402, 404, 406 of FIG. 4.

It may be appreciated that, although the content objects and/or design of layers in the simulated view (e.g., interface 400) and in the broadcast view (e.g., interface 500) may match or be the same (e.g., have the same information), their visual representations may appear differently. For example, the broadcast view of FIG. 5 shows layers stacked from front to back, while the simulated view in FIG. 4 notes the same order using order fields 418 but shows the corresponding layers in a different arrangement side-by-side.

Other user interfaces or simulations may be used. For example, in one embodiment, a moderator may operate a simulation that appears exactly as the client broadcast, e.g., using additional side tabs for providing options.

It may be appreciated that "real-time" may refer to instantly or, more often, at a small time delay of, for example, between 0.01 and 10 seconds, during, concurrently, or substantially at the same time as.

It may be appreciated that although certain devices and functionality are assigned to "moderators," "viewers," and "clients," these are only example scenarios and such functionality may be implemented by any users.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method for broadcasting to a plurality of client side devices comprising:
   receiving input for simulating a media broadcast in a staging area that mimics a broadcast screen to prepare a broadcast off-air, the media broadcast comprising a plurality of media layers, wherein each layer is defined by content objects and arrangement in the simulated media broadcast;
   triggering the transmission of the content objects for each of a plurality of the layers in a different live stream to each of the client side devices; and
   triggering the transmission of design parameters defining the arrangement of the layers in the simulated media broadcast to each of the client side devices, wherein each of the client side devices is adapted to assemble the layers of a media broadcast according to the content objects and design parameters of the transmissions so that the media is broadcast on-air at each of the client side devices having content objects and design that substantially match those of the simulated media broadcast.

2. The method of claim 1 comprising displaying the media broadcast simultaneously at all the client side devices.

3. The method of claim 1 comprising displaying the media broadcast at each of the client side devices in real-time as the media broadcast is simulated.

4. The method of claim 1, wherein at least one of the layers is personalized for each client side device according to the personal information associated with the client side device user(s).

5. The method of claim 1, wherein at least one of the layers is interactive updating the content instantiated in at least one of the content objects in response to receiving input from a user interacting with the layers at the client side devices.

6. The method of claim 5, wherein interactive content updates are updated remotely from a source server.

7. The method of claim 5, wherein the content for interactive updates is transmitted with the layer content objects and is stored at the client side devices to locally update the interactive layer.

8. The method of claim 1, wherein the media broadcast assembled at each the client side devices includes the same content objects as the simulated media broadcast, but which are instantiated differently at each of a plurality of the client side devices.

9. The method of claim 1, wherein the media broadcast is simulated at a staging environment interface providing links to media content from a plurality of different servers.

10. The method of claim 1, wherein the media broadcast is simulated at a centralized server.

11. The method of claim 1, wherein the media broadcast is simulated at a client side.

12. A system for broadcasting to a plurality of client side devices comprising:
   a server to receive input from a moderator device for simulating a media broadcast in a staging area that mimics a broadcast screen to prepare the media broadcast off-air, the broadcast comprising a plurality of media layers, wherein each layer is defined by content objects and arrangement in the simulated media broadcast,
   wherein receiving the input triggers the server to transmit to each of the client side devices the content objects for each of a plurality of the layers in a different live stream and design parameters defining the arrangement of the layers in the simulated media broadcast,
   wherein each of the client side devices is adapted to assemble the layers of a media broadcast according to the content objects and design parameters of the transmissions so that the media is broadcast on-air at each of the client side devices having content objects and design that substantially match those of the simulated media broadcast.

* * * * *